United States Patent [19]

Isobe et al.

[11] Patent Number: 4,982,288
[45] Date of Patent: Jan. 1, 1991

[54] HIGH DEFINITION TELEVISION RECEIVER ENABLING PICTURE-IN PICTURE DISPLAY

[75] Inventors: Mitsuo Isobe, Osaka; Masanori Hamada, Kadoma, both of Japan

[73] Assignee: Matsushita Electric Industrial Co., Ltd., Osaka, Japan

[21] Appl. No.: 310,925

[22] Filed: Feb. 16, 1989

[51] Int. Cl.$^5$ .................................................. H04N 5/273
[52] U.S. Cl. ...................................... 358/183; 358/22
[58] Field of Search .................. 358/183, 22, 138, 140

[56] References Cited

U.S. PATENT DOCUMENTS 4,853,765  8/1989  Katsumata et al. ............... 358/22 X

FOREIGN PATENT DOCUMENTS 492419  1/1974  Japan .

OTHER PUBLICATIONS

"HD-TV Broadcasting System Using Single Channel Satellite (MUSE)".

Primary Examiner—James J. Groody
Assistant Examiner—Mark R. Powell
Attorney, Agent, or Firm—Stevens, Davis, Miller & Mosher

[57] ABSTRACT

A television signal receiving apparatus of the type in which when performing a picture in picture operation by receiving a plurality of picture signals compressed in band width by multiple sub-Nyquist sampling, a sub-channel signal is first subjected to a spatial interpolating process and combined with a main-channel signal. The still picture portion and moving picture portion of a first input signal are restored to a field offset sub-sampled first picture signal, and a second input signal is restored to a field offset sub-sampled picture signal, subjected to a size-reducing process by time base compression in the vertical and horizontal directions of the picture and delivered as a second picture signal of the form synchronized in phase with a given position of the first picture signal. The first and second picture signals are time-division multiplexed to deliver a third picture signal onto a picture screen.

1 Claim, 3 Drawing Sheets

HIGH DEFINITION TELEVISION RECEIVER ENABLING PICTURE-IN PICTURE DISPLAY

BACKGROUND OF THE INVENTION

The present invention relates to a television signal receiving apparatus and more particularly to a receiving apparatus of the type having a picture-in picture function which receives as an input a plurality of television signals subjected to a band width compressing process by multiple sub-Nyquist sampling.

According to the existing television standards, television receiving apparatus of the type having a so-called picture-in-picture function to simultaneously show pictures from a plurality of channels on one picture screen are known. An example thereof is disclosed for example in JP-A-49-2419 and receivers having this function have been put in practical use.

Presently, the receivers of this type have generally had a construction in which the necessary luminance signal and chrominance signals for the reproduction of color pictures are respectively converted to baseband signals and, after such processes as timebase compression have been effected, the sub-channel signals are inserted into the main channel side. For instance, as shown in FIG. 2, on the main channel side an NTSC first video signal, supplied to a first signal input terminal 1, is processed through a first luminance processing circuit 11 and a first chrominance signal demodulator 12 and these processing circuits respectively supply the resulting luminance signal and two color difference signals to one input terminal of the corresponding switches $SW_1$ to $SW_3$. On the subchannel side, the NTSC second video signal from a second signal input terminal 2 is processed through a second luminance processing circuit 21 and a second chrominance signal demodulator 22, and time compression circuits 23 and 24 respectively supply a subchannel side luminance signal and two color difference signals which were subjected to time base compression in synchronism with the phase of signals supplied from a main channel-side synchronizing circuit 13 through lead wires 25 to the other input terminal of the switches $SW_1$ to $SW_3$. A signal selecting circuit 15 including the switches $SW_1$ to $SW_3$ is switched by a control signal supplied from the synchronizing circuit 13 through a lead wire 14 so as to combine the main channel-side and subchannel-side signals in the same picture and thus three primary color signals R, G and B are respectively delivered to output terminals 17, 18 and 19 through a De-matrix circuit 16.

On the other hand, in accordance with a high quality television system, a method of effecting band width compression by multiple sub-Nyquist sampling for the transmission of its wide band video signals has been proposed see [The Institute of Television Engineers of Japan, Research Society Report "HD-TV Broadcasting System Using Single Channel Satellite (MUSE)", TEBS 95-2 Vol. 7, No. 44].

This MUSE system is designed so that an offset is provided in sampling phase between the fields, the frames and the lines and the processing is performed in such a manner that one cycle of the sampling phase is completed by four fields or two frames, thereby transmitting video signals. Thus, a receiving apparatus includes for example a frame memory to store video signals successively transmitted for four fields and then the signals are combined to restore a still picture portion and also a moving picture portion is restored by spatial interpolation within a single field. An example of a receiving apparatus according to the MUSE system will now be described with reference to FIG. 3.

A digitized picture signal is applied to a signal input terminal 300 and the signal is supplied through a lead wire 301 to an interframe interpolating circuit including a switch 302 and a frame memory 303. The switch 302 multiplexes an incoming input signal and the signal of the preceding frame fed back from the frame memory 303 to select and deliver the resulting picture signal subjected to interframe interpolation. On the other hand, the picture signal supplied to the signal input terminal 300 is also supplied through a lead wire 305 to a spatial interpolating circuit 306 which performs a given filtering process and the spatial interpolating circuit 306 supplies a signal for the moving portion in the picture to a mixer circuit 308 through a lead wire 307. The picture signal subjected to interframe interpolation and delivered onto the lead wire 304 is supplied to each of the mixer circuit 308 and a motion detecting circuit 311 through lead wires 309 and 310, respectively. The output of the frame memory 303 is supplied to the other input of the motion detecting circuit 311 through a lead wire 312 so that the moving portion is detected by using the frame correlation of the pictures and a motion control signal is supplied to the mixer circuit 308 through a lead wire 313.

Thus, in response to the motion control signal supplied through the lead wire 313, the mixer circuit 308 outputs the signal from the lead wire 309 with respect to the picture elements of the still picture portion and the signal from the lead wire 307 with respect to the picture elements of the moving picture portion by mixing them at a given ratio or selectively. The output of the mixer circuit 308 is supplied through a lead wire 316 to a field memory 314 and one input of an interpolating filter 315 for performing an interpolating process between fields, and the interpolating filter 315 is designed so that in response to the motion control signal supplied from the motion detecting circuit 311 through a lead wire 317, an interfield interpolating process is performed only on the picture elements of the still picture portion and a restored high quality television picture is delivered to a signal output terminal 316.

The above-described receiving apparatus according to the MUSE system is used for the purpose of restoring the original picture signal of the high quality television system from a band width compressed incoming signal. Thus, where the picture-in-picture operation is performed by such a receiving apparatus, it is conceivable to arrange receiving apparatus of the construction shown in FIG. 3 in parallel so that after restoring the mainchannel and sub-channel band width compressed high quality television signals, the signals are combined by such known method as shown in FIG. 2.

However, this construction has serious practical disadvantages in that the scale of the receiving apparatus for picture-in-picture operation is increased by more than two times and so on.

SUMMARY OF THE INVENTION

To accomplish the above objects, in accordance with the present invention there is provided a receiving apparatus including at least a first signal processing circuit comprising an interframe interpolating circuit for receiving a first input signal for restoring the still picture portion of the first input signal, a first spatial interpolating circuit for restoring the moving picture portion, a motion detecting circuit for detecting the still picture portion and the moving picture portion and a first signal selecting circuit adapted to be controlled by the motion detecting circuit to receive the output signals of the interframe interpolating circuit and the first spatial interpolating circuit so as to mix the signals at a given ratio or select either one of the signals thereby generating a first processed picture signal, a second signal processing circuit comprising a second spatial interpolating circuit for receiving a second input signal as an input and a time compressing circuit for synchronizing an output signal of the second spatial interpolating circuit and the first input signal in phase and for subjecting the said output signal to time base compression thereby generating a second processed picture signal, and a second signal selecting circuit for receiving the output signals of the first and second signal processing circuits for time-division multiplexing.

The first signal processing circuit restores the first input signal or the still picture portion and the moving picture portion into a first picture signal of the field offset sub-sampled state through the interframe interpolating circuit, the first spatial interpolating circuit, the first signal selecting circuit and the motion detecting circuit, and the second signal processing circuit not only restores the second input signal into the picture signal of the field offset sub-sampled state but also reduces the size of the picture by the time base compression in its vertical and horizontal directions through the time compression circuit thereby sending the signal as a second processed picture signal of the form synchronized in phase with a given position of the first processed picture signal. The second signal selecting circuit receives the first and second picture signals as input signals to time-division multiplex the first and second picture signals to deliver a third picture signal into the same picture screen.

From the foregoing it will be seen that the invention has a great industrial utility in that when receiving a plurality of picture signals subjected to band width compression by the MUSE system as mentioned previously to perform a picture-in-picture operation, the sub-channel signal is first subjected to spatial interpolation and it is then combined with the main-channel signal thereby simplifying the overall construction of television receiving according to the invention.

DESCRIPTION OF THE PREFERRED EMBODIMENT

Figure 1:
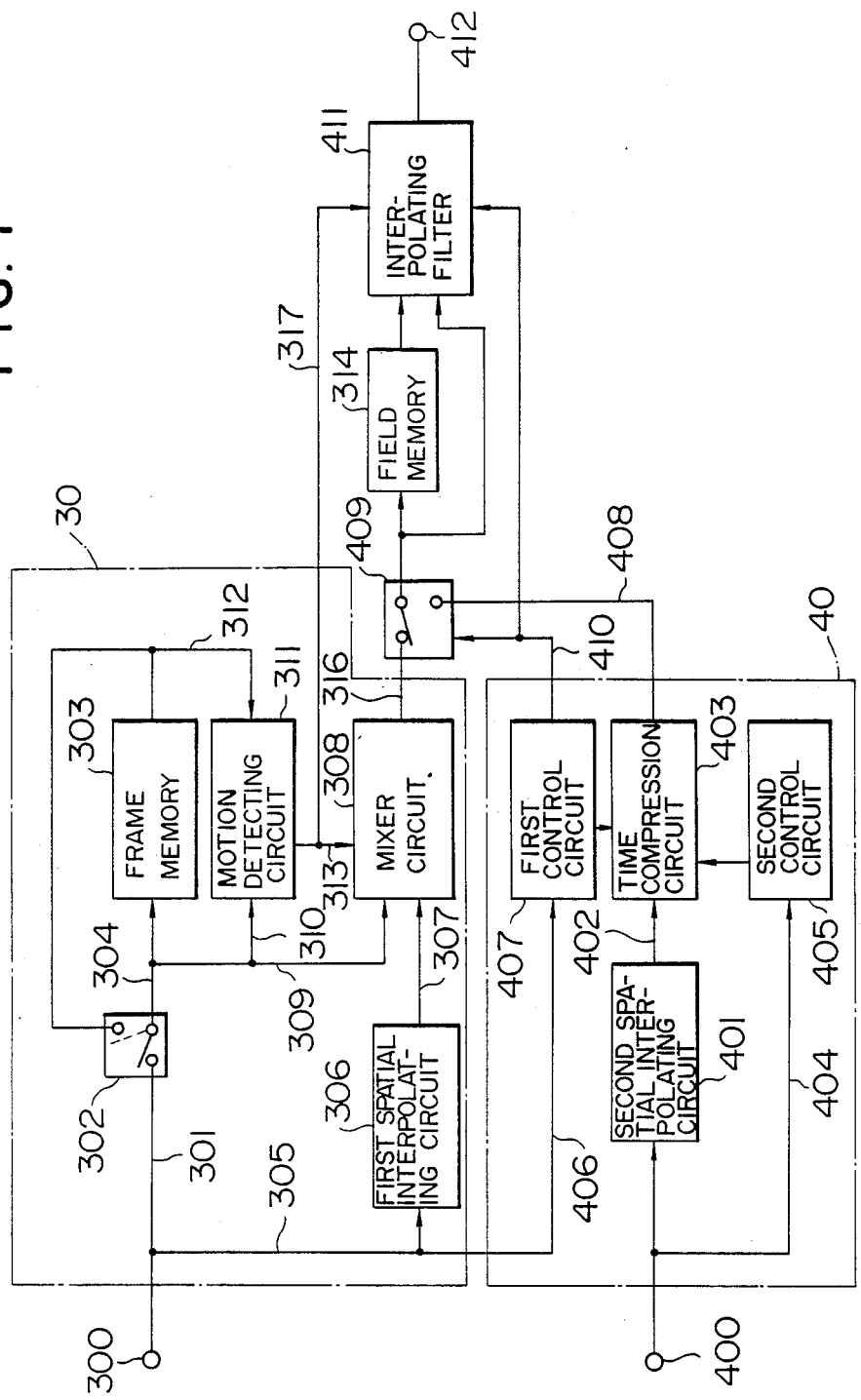
FIG. 1 is a block diagram for a television signal receiving apparatus according to an embodiment of the present invention.
Figure 2:
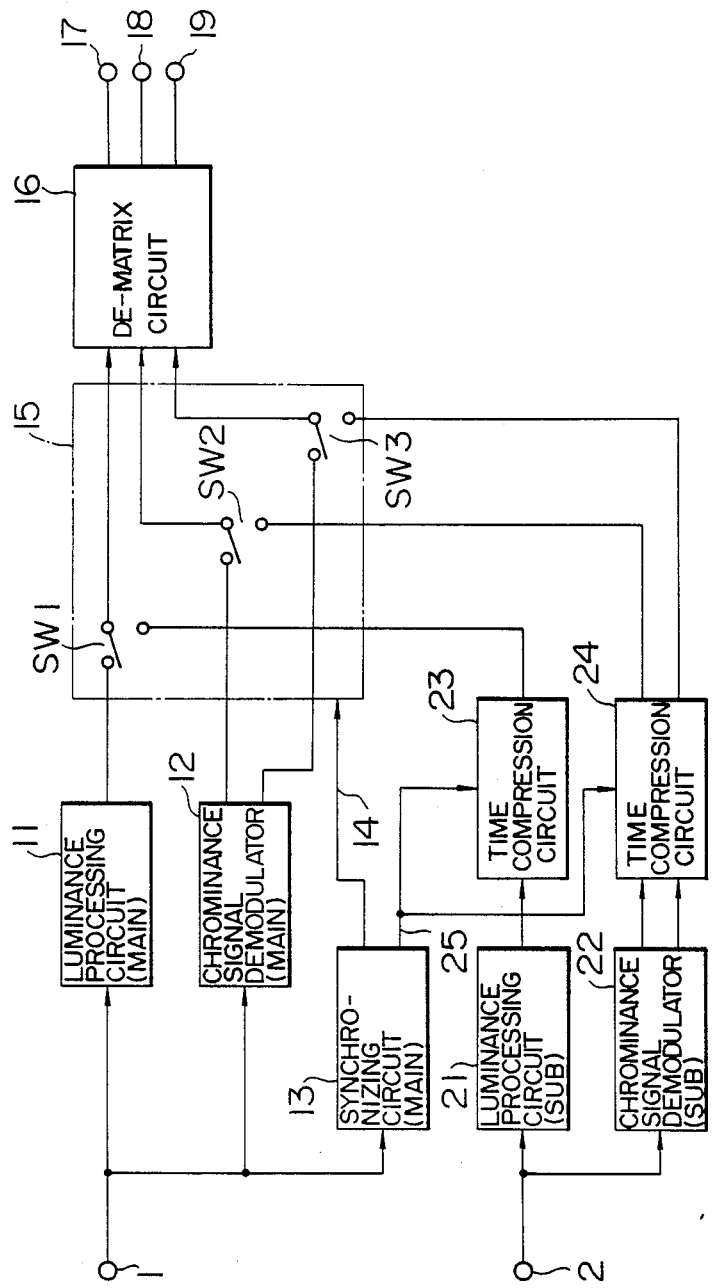
FIGS. 2 and 3 are block diagrams showing conventional television signal receiving apparatus.
Figure 3:
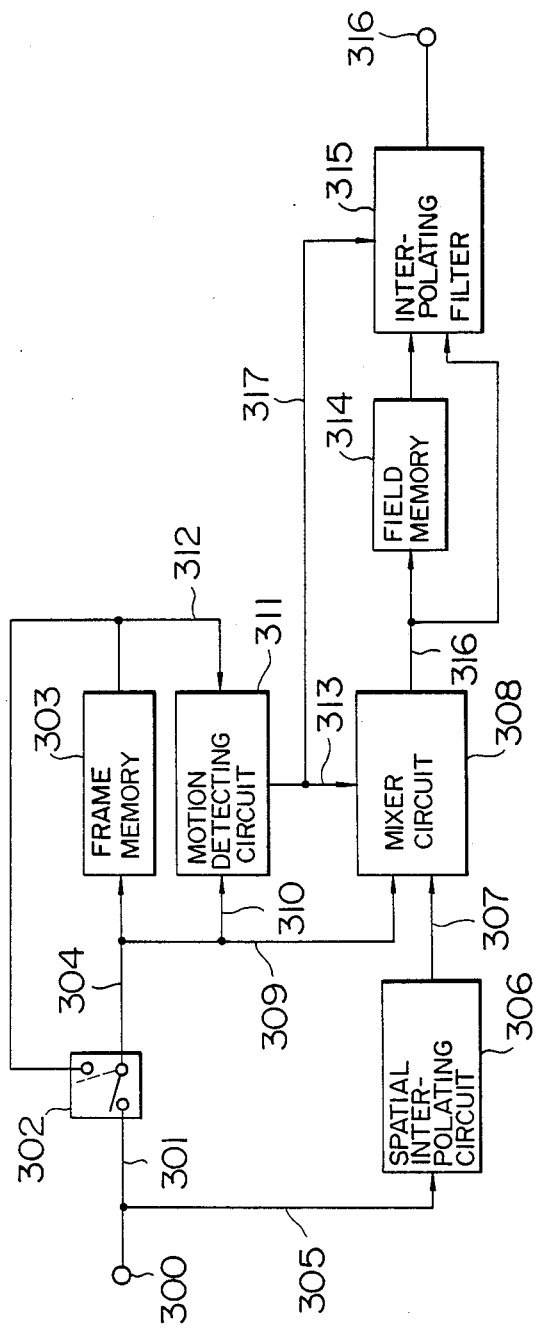

A preferred embodiment of the invention will now be described in detail with reference to FIG. 1 in which those component parts which are identical in function and operation with their counterparts in the conventional apparatus shown in FIG. 3 are designated by the same reference numerals and will not be described in any detail. In FIG. 1 showing a block diagram of an embodiment of the invention, a first input signal supplied from a first signal input terminal 300 is processed by a first signal processing circuit 30 including a switch 302, a frame memory 303, a first spatial interpolating circuit 306, a motion detecting circuit 311 and a mixer circuit 308 forming a first signal selecting circuit according to the invention and thus a first picture signal of the field offset sub-sampled state is delivered onto a lead wire 316. A second input signal supplied from a second input terminal 400 is subjected to a two-dimensional interpolation process by a second spatial interpolating circuit 401 to deliver a picture signal of the field offset sub-sampled state onto a lead wire 402. A time compression circuit 403 is controlled by a second control circuit 402 which is operable in response to the synchronizing information of the second input signal from a lead wire 404 to store in a memory the picture signal supplied from the second spatial interpolating circuit 401 through a lead wire 402. Also, in response to a read control signal from a first control circuit 407 which is operable in response to the synchronizing information of the first input signal supplied through a lead wire 406, the time compression circuit 403 reads the picture signal in a time compressed form to deliver it as a second picture signal onto a lead wire 408. The first picture signal delivered onto the lead wire 316 by the first signal processing circuit 30 and the second picture signal delivered onto the lead wire 408 by the second signal processing circuit 40 are the same in signal processing rate so that the desired thinning process of the picture information is performed by the time compression circuit 403 in response to either one or both of the second control circuit 405 for controlling writing into the memory and the first control circuit 407 for controlling reading from the memory. For instance, where it is desired to subject the second picture signal delivered onto the lead wire 408 to a time compression of 4 to 1 horizontally and vertically, this can be realized by processing the signal by the ratio of 4 to 1 with respect to every four picture elements and four scan lines during writing or reading or alternatively the writing and reading are processed by the ratio of 2 to 1 horizontally and vertically and also, in accordance with the invention, the second spatial interpolating circuit 401 may be provided with a narrow band characteristic to use it concurrently to perform the required low-pass filtering for preventing the occurrence of any folding distortion due to the time compressing process. While the second signal selecting circuit 409 supplied with the first and second picture signals through the lead wires 316 and 408 selects either one of the signals for timedivision multiplexing in response to the control signal supplied from the first control circuit 407 through the lead wire 410, the invention is not limited to it and a mixer circuit may for example be used. With a field offset sub-sampled picture signal processing circuit including a field memory 314 and an interpolation filter 411, during the time that the second signal selecting circuit 409 selects the output signal of the first signal processing circuit 30 from the lead wire 316, the interfield interpolating operation on the moving picture portion is inhibited by a control signal supplied from the motion detecting circuit 311 through the lead wire 317, whereas during the time that the second signal selecting circuit 409 selects the second picture signal supplied from the second signal processing circuit 40 through the lead wire 408, the interfield interpolating operation is inhibited by a control signal from the lead wire 410, thereby combining the first input signal as a main-channel signal and the second input signal as a sub-channel signal and delivering the resulting picture signal to a signal output terminal 412.

I claim:

1. A television signal receiving apparatus enabling a picture-in-picture display function for receiving multiple subNyquist sampling band-compressed high definition television signals, said apparatus comprising:

a first signal processing circuit for receiving and processing a first input television signal for providing a main picture display of said high definition television signals, said first input signal processing circuit comprising means for performing (i) interframe interpolation processing and interfield interpolation processing on a still picture portion of said first television signal by using picture signals of two substantially adjacent-frames and (ii) two-dimensional spatial interpolation processing on a motion picture portion in horizontal and vertical directions in a single field signal of said first input television signal to provide a first processed picture signal;

a second signal processing circuit for receiving and processing a second input television signal for providing a sub-picture display of said high definition television signals, said second signal processing circuit comprising means for performing a two-dimensional spatial interpolation processing and a time-base compression processing on both a still picture portion and a motion picture portion of said second input television signal to provide a second processed picture signal; and a signal selection circuit for receiving and timedivisionally multiplexing the first and second processed picture signals supplied from said first and second signal processing circuits to deliver a single picture-in-picture output signal.

* * * * *